(12) United States Patent
Venkatakrishnan et al.

(10) Patent No.: US 11,490,221 B2
(45) Date of Patent: Nov. 1, 2022

(54) POINT OF INTEREST DATA CREATION FOR USE WITH LOCATION-AWARE MOBILE DEVICES

(71) Applicant: Yellcast, Inc., San Carlos, CA (US)

(72) Inventors: Ganesan Venkatakrishnan, San Carlos, CA (US); Peter Ellenby, Portland, OR (US); Thomas William Ellenby, San Jose, CA (US); Peter Negulescu, San Francisco, CA (US)

(73) Assignee: Yellcast, Inc., San Carlos, CA (US)

( * ) Notice: Subject to any disclaimer, the term of this patent is extended or adjusted under 35 U.S.C. 154(b) by 0 days.

(21) Appl. No.: 17/027,627

(22) Filed: Sep. 21, 2020

(65) Prior Publication Data
US 2021/0092218 A1  Mar. 25, 2021

Related U.S. Application Data

(60) Provisional application No. 62/903,631, filed on Sep. 20, 2019.

(51) Int. Cl.
| | |
|---|---|
| *H04W 4/021* | (2018.01) |
| *G06F 3/01* | (2006.01) |
| *H04W 4/029* | (2018.01) |
| *G06F 16/22* | (2019.01) |
| *G06F 16/29* | (2019.01) |

(Continued)

(52) U.S. Cl.
CPC ............ *H04W 4/021* (2013.01); *G06F 3/017* (2013.01); *G06F 16/22* (2019.01); *G06F 16/29* (2019.01); *H04M 1/7243* (2021.01); *H04M 1/72457* (2021.01); *H04W 4/026* (2013.01);

(Continued)

(58) Field of Classification Search
CPC ..... H04W 4/021; H04W 4/026; H04W 4/029; H04W 4/80; H04W 84/12; G06F 3/017; G06F 16/22; G06F 16/29; H04M 1/7243; H04M 1/72457; H04M 1/72403; H04M 1/72436; H04M 2250/12; G06Q 20/12; G06Q 20/32; G06Q 20/3226; G06Q 20/327

See application file for complete search history.

(56) References Cited

U.S. PATENT DOCUMENTS

| | | | |
|---|---|---|---|
| 2008/0231610 A1 | 9/2008 | Hotelling et al. | |
| 2012/0075452 A1* | 3/2012 | Ferren | H04N 7/183 |
| | | | 348/78 |

(Continued)

OTHER PUBLICATIONS

International Search Report and Written Opinion issued for International Patent Application No. PCT/US2020/051881, dated Dec. 20, 2020, 12 pages.

*Primary Examiner* — Marcos L Torres
(74) *Attorney, Agent, or Firm* — Haynes and Boone LLP; Philip H. Albert

(57) ABSTRACT

Interacting between users of mobile devices is provided by initiating a desired interaction at a first user device using a gesture sensed by the first user device, determining a gesture area, submitting a desired interaction request for interaction with associated users within the gesture area, and sending a notification to user devices indicating the desired interaction of the first user with one or more users of a local subset, wherein the notification identifies the first user with an identifier independent of identifiers used by the first user outside of interactions with a remote server.

3 Claims, 10 Drawing Sheets

(51) Int. Cl.
  *H04M 1/72457*  (2021.01)
  *H04W 4/02*  (2018.01)
  *H04M 1/7243*  (2021.01)
  *H04W 4/80*  (2018.01)
  *H04W 84/12*  (2009.01)

(52) U.S. Cl.
  CPC .............. *H04W 4/029* (2018.02); *H04W 4/80* (2018.02); *H04W 84/12* (2013.01)

(56) References Cited

U.S. PATENT DOCUMENTS

2012/0123860 A1   5/2012  Schrenk
2012/0293440 A1  11/2012  Hotelling et al.
2013/0074014 A1   3/2013  Ouyang et al.
2018/0073889 A1*  3/2018  Vigilante .............. G06F 3/0481
2019/0114835 A1*  4/2019  Costa .................... G06T 11/203

* cited by examiner

POINT OF INTEREST DATA CREATION FOR USE WITH LOCATION-AWARE MOBILE DEVICES

CROSS-REFERENCE TO PRIORITY AND RELATED APPLICATION

This application claims benefit of, and is a non-provisional of, U.S. Provisional Patent Application No. 62/903,631, filed Sep. 20, 2019, entitled "Methods of Point of Interest Data Creation, Geographic Gesture Based Verification, Social, Commerce and Security Actions and Interactions, Using Spatially-Aware Mobile Computing Devices."

This application incorporates by reference U.S. Pat. No. 8,527,357 entitled "Client and Server System for Coordinating Messaging Between Motivated Buyers and Listed Sellers" to Venkatakrishnan Ganesan (herein "Ganesan I") and U.S. patent application Ser. No. 16/908,627, filed Jun. 22, 2020, entitled "Methods for Geographic Gesturing Using a Mobile Device for Interactions with Nearby Other Mobile Devices" naming Venkatakrishnan Ganesan (herein "Ganesan II").

The entire disclosure of the applications/patents recited above are hereby incorporated by reference, as if set forth in full in this document, for all purposes.

FIELD OF THE INVENTION

The present disclosure generally relates to local geographically-based actions and interactions initiated by, and based upon, physical gestures with mobile devices. The disclosure relates more particularly to apparatus and techniques for creating point of interest data using location-aware mobile computing devices.

BACKGROUND

Often people navigate unfamiliar or even familiar cities, towns, or other geographic regions while carrying a mobile computing device that can provide information and communicate with remote services to send and receive data, as well as provide location services as to the location of the mobile computing device relative to a coordinate system, such as a coordinate system in which landmarks, business locations, homes, points of interest, and the like can be located using coordinates in that coordinate system.

Sometimes, users of such mobile computing device will want to look up a point of interest (POI) or input data to add one to a POI database where one does not already exist. Also, such users might want to perform other actions using their mobile computing device.

SUMMARY

In a particular embodiment, there is infrastructure that mobile devices can connect to that each have storage for data and program code, such as a smartphone app. Functionality is provided for generating points of interest ("POI") data, perhaps with a user interface for interacting with the user via smartphone displays and inputs, with sensors for position and orientation, storage for POI data, sources of POI data, and a network for them to communicate over and perhaps one or more servers that the smartphones communicating with.

A method of identifying a point of interest might include (1) having a user input parameters of a first ray in a geographic space, wherein the user input is in a form of interaction with a mobile device of the user with the parameters of the first ray including a first position of the mobile device as a point on the first ray, a second point on the first ray defined by the input parameters using the mobile device, with the first ray extending from the first position in a direction indicated by the second point, (2) having a user input parameters of a second ray in a geographic space, wherein the user input is in the form of interaction with a mobile device of the user, from a second position, with the parameters of the second ray including a third position of the mobile device as a point on the second ray, a fourth point on the second ray defined by the input parameters using the mobile device, with the second ray extending from the third position in a direction indicated by the fourth point, and (3) determining an intersection of the first ray and the second ray.

The second point on the first ray might be defined by the input parameters using the mobile device is defined based on a swinging or pointing motion using the mobile device. Further included might be prompting the user to move from the first position of the mobile device to the third position. Prompting the user to move might be a prompt to move from the third position of the mobile device to a fifth position following detection of insufficient resolution as to the intersection of the first ray and the second ray.

The following detailed description together with the accompanying drawings will provide a better understanding of the nature and advantages of the present invention.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Using smart mobile devices, and other devices, users can take local geographically based actions and engage in interactions that are initiated by and based upon a physical gesture of a mobile device, generally a mobile phone or a tablet. A gesture might be deemed to have been made upon detection of particular movements or actions as might be determined by the mobile device's accelerometers, gyroscopes or other internal sensors used to determine a device's spatial state and/or motion, combined with that device's real world position as sensed by the mobile device's positioning sensors such as GPS, AGPS or other position sensing technology and the device's compass bearing (pointing direction) as determined by the mobile device's compass or other means of determining pointing direction. For example, by monitoring the compass and accelerometers of the mobile device, or other sensors that record the spatial situation of mobile devices such as smart phones and tablets, the mobile device can initiate a local geographically based action and/or interaction in a specific direction.

A geolocated point of interest (POI) might be represented in a data structure by a single point, a latitude and longitude or other geographic coordinate system, POIs and Polygon and Polyhedron, or other 3D shapes such as spheres or cones, POIs. The system allows these functions to be performed by a single user of a mobile device equipped with a positioning means, GPS, AGPS etc., and a means of determining the device's orientation such as a digital compass, gyroscopes etc. By combining two or more pointing or casting actions comprising determining the position of the phone and its orientation two unique vectors are created. The intersection of these vectors, each from a unique position (point A and point B), or shapes associated with these vectors results in a unique point. This intersection corresponds to an approximate the location of a single point POI or one of the nodes for a polygon or polyhedron POI. These methods can be useful when one is unable to stand on or within the area of the POI to be created. Additionally, a user would have the ability to create multiple POIs without having to be physically at each location that a point POI or POI node is to be created.

Figure 1:
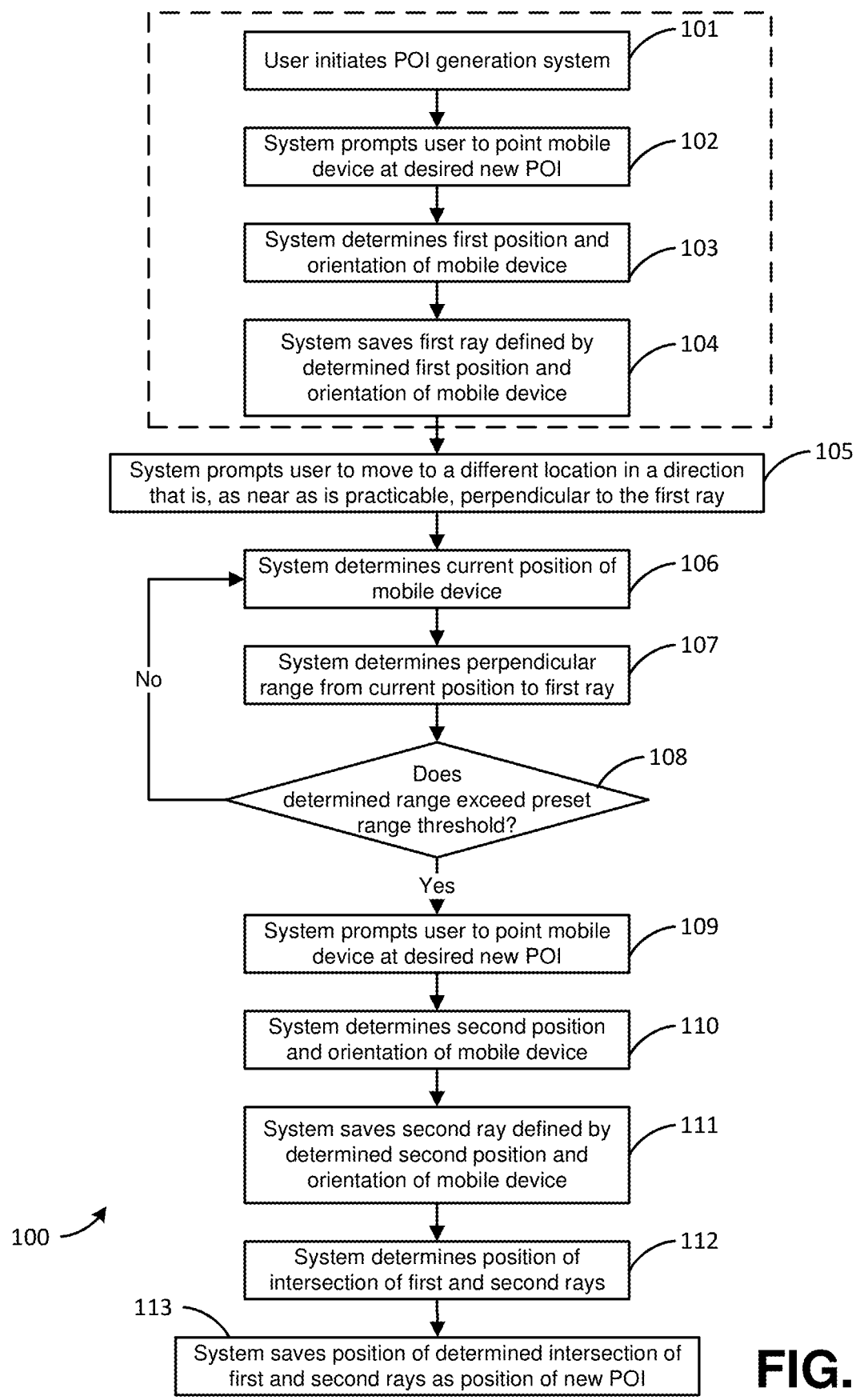
FIG. 1 is a flowchart illustrating a possible mode of operation of the system using a range threshold.

FIG. 1 is a flowchart 100 illustrating a possible mode of operation of the system utilizing a range threshold. In step 101, the user of the system initiates the POI generation system. The flowchart then branches to step 102. In step 102 the system prompts the user to point the mobile device that the system is running on at the location of the desired new POI. The flowchart then branches to step 103. In step 103, the system determines a first ray origin. A ray origin might be a data element represented by a position and an orientation, by a pointing direction, or some other data representation, where the ray origin can be an indication of a position and an orientation of a mobile device at the time the ray origin was captured. The ray origin can comprise a two-dimensional point or a three-dimensional point and the orientation might be in one, two, or three dimensions. The flowchart then branches to step 104. In step 104 the system saves a first ray origin derived by information from the mobile device. The flowchart then branches to step 105. In step 105 the system prompts the user to move in a direction away from, such as in a direction as near as practicable to perpendicular to, the first ray. The flowchart then branches to step 106. In step 106 the system monitors the current position of the mobile device. The flowchart then branches to step 107. In step 107 the system determines the current perpendicular range from the current position to the first ray. The flowchart then branches to step 108. In step 108 the system determines if the perpendicular range from the current position to the first ray exceeds a preset range threshold. If the perpendicular range from the current position to the first ray does not exceed a preset range threshold then the flowchart branches back to step 106. If the perpendicular range from the current position to the first ray does exceed a preset range threshold then the flowchart branches to step 109. In step 109 the system prompts the user of the system to point the mobile device at the desired new POI. The flowchart then branches to step 110. In step 110 the system determines position and orientation of the mobile device and derives a second ray origin. The flowchart then branches to step 111. In step 111 the system saves the second ray origin. The flowchart then branches to step 112. In step 112 the system determines the position of the intersection of the saved first ray and saved second ray. The flowchart then branches to step 113 in which the system saves the determined location of the intersection of the first and second rays as the position of the new POI and prompts the user to add other information as desired relating to that new POI such as name, type, etc. It should be noted that while as described this method constantly monitors the position of the mobile device, and hence constantly determine the range from the current position to the first position, to automatically prompt the user of the system to point the mobile device at the desired new POI when the range threshold has been exceeded the system could alternately operate in a mode in which the range is not being constantly calculated but instead the user changes position and points the mobile device and if the determined range does not exceed the range threshold then the system would prompt the user to move further.

Figure 2:
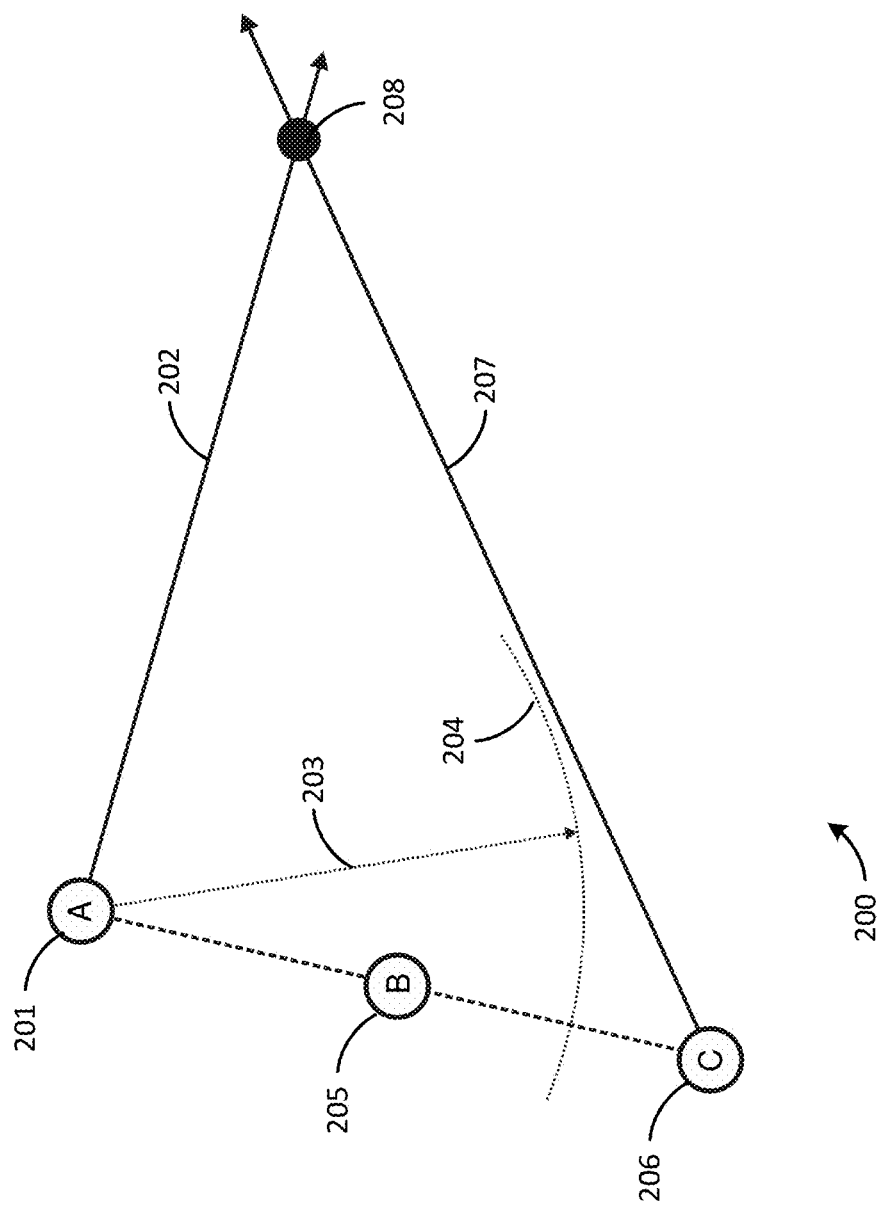
FIG. 2 is a line drawing in plan illustrating a mobile device generating a new POI using a mode of operation shown in FIG. 1.

FIG. 2 is a line drawing 200 in plan illustrating a mobile device generating a new POI using the mode of operation described in FIG. 1 and related text. A mobile device at position A 201 is pointed at the desired new POI and this results in a first ray 202 being saved. The mobile device position is then moved by the user of the system and the system monitors the current range from its current position to position A 201. At position B 205 the range to position A 201 does not exceed the preset range threshold 204 defined by a preset range threshold value 203. At position C 206 the range to position A 201 does exceed the preset range threshold 204 defined by a preset range threshold value 203 and therefore the user of the system is again prompted to point the mobile device at the desired new POI resulting in the saved second ray 207. The system then determines the position of the intersection 208 of the first and second rays and hence determines the position of the new POI.

Figure 3:
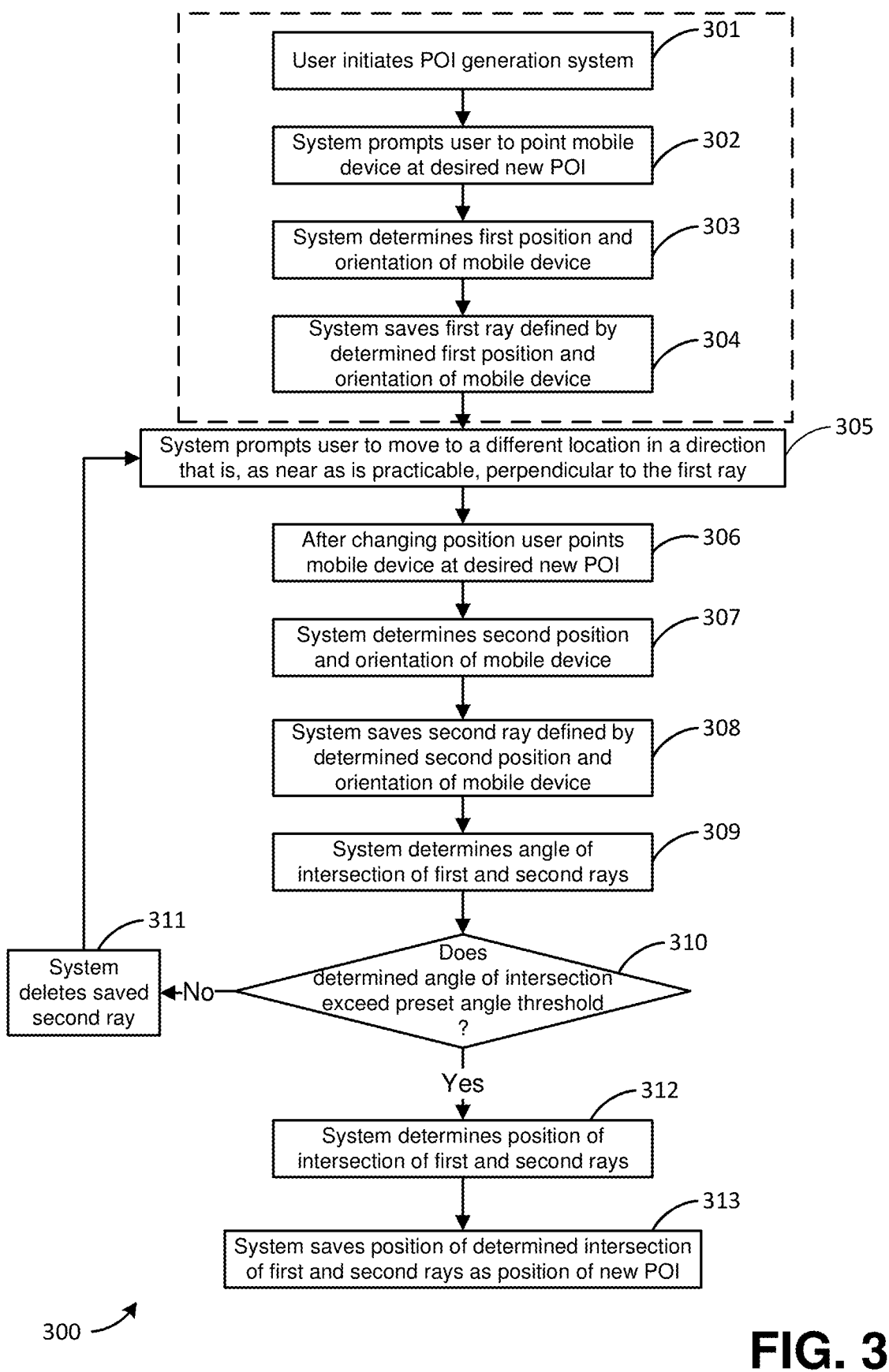
FIG. 3 is a flowchart illustrating a possible mode of operation of the system using an angle threshold.

FIG. 3 is a flowchart 300 illustrating a possible mode of operation of the system utilizing an angle threshold. In step 301 the user of the system initiates the POI generation system. The flowchart then branches to step 302. In step 302 the system prompts the user to point the mobile device that the system is running on at the location of the desired new POI. The flowchart then branches to step 303. In step 303 the system determines a first position and orientation, or a pointing direction, of the mobile device and from that, a first ray origin. The flowchart then branches to step 304. In step 304 the system saves a first ray origin. The flowchart then branches to step 305. In step 305 the system prompts the user to move in a direction away from the first ray origin, such as in a direction as near as practicable to perpendicular to it. The flowchart then branches to step 306. In step 306 the user, after changing position, points the mobile device at the desired new POI. The flowchart then branches to step 307. In step 307 the system determines the second position and orientation of the mobile device. The flowchart then branches to step 308 in which the system saves the second ray origin that is based on the determined second position and orientation of the mobile device. The flowchart then branches to step 309. In step 309 the system determines the angle of intersection between the first and second rays, which can be done from the ray origins, as a ray origin specifies a point and an orientation. The flowchart then branches to step 310. In step 310 the system determines if the angle of intersection between the first and second rays exceeds a preset angle threshold. If the angle of intersection between the first and second rays does not exceed a preset angle threshold then the flowchart branches to step 311, in which the system deletes the saved second ray, and then branches back to step 305. If the angle of intersection between the first and second rays does exceed a preset angle threshold then the flowchart branches to step 312. In step 312 the system determines the position of the intersection of the first and second rays. The flowchart then branches to step 313 in which the system saves the determined location of the intersection of the first and second rays as the position of the new POI and prompts the user to add other information as desired relating to that new POI such as name, type, etc.

Figure 4:
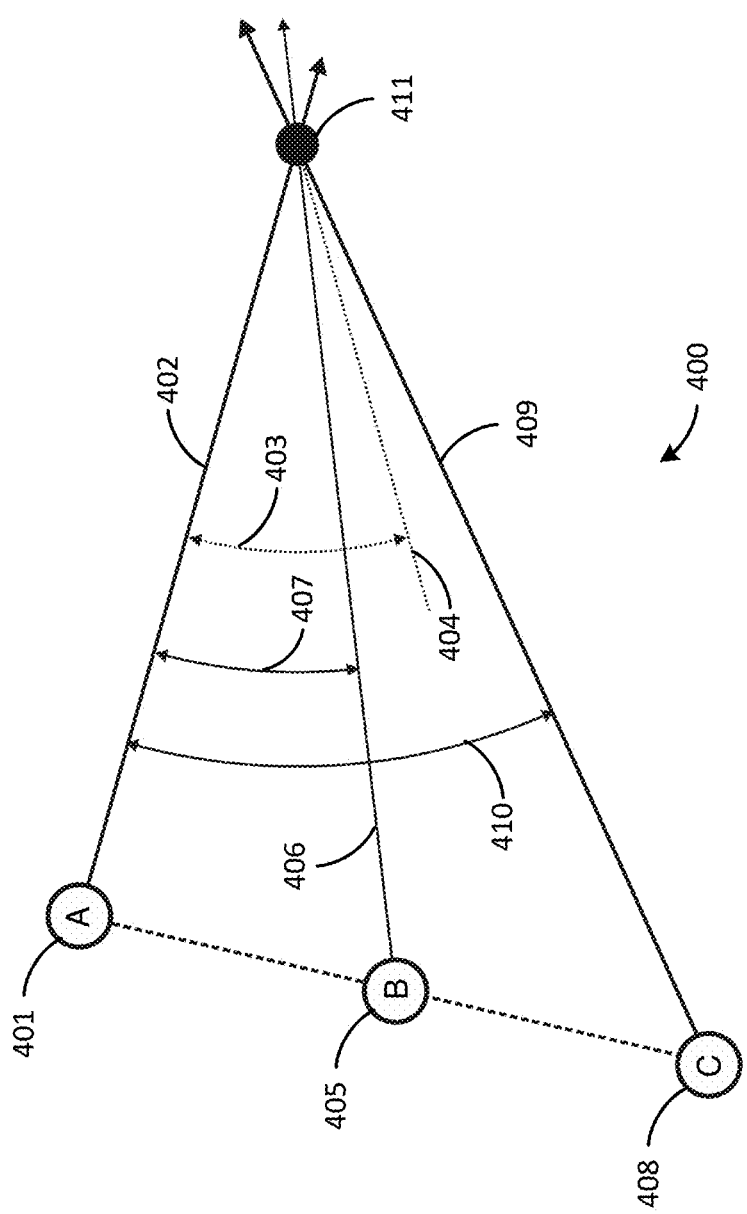
FIG. 4 is a drawing, in plan view, illustrating a mobile device generating a new POI using a mode of operation shown in FIG. 3.

FIG. 4 is a line drawing 400 in plan view illustrating a mobile device generating a new POI using the mode of operation described in FIG. 3 and related text. A mobile device at position A 401 is pointed at the desired new POI and this results in a first ray 402 being saved. The mobile device position is then moved by the user of the system to position B 405. At position B 405 the user of the system points the mobile device at the desired POI and this results in a second ray 406 being saved by the system. The system then determines the angle of intersection 407 between the first and second rays. This angle of intersection does not exceed the preset angle threshold 404 defined by a preset angle threshold value 403. The system therefor deletes the saved second ray and prompts the user of the system to again move away from the first position A 401. At position C 408 the user of the system points the mobile device at the desired POI and this results in a new ray for second ray 409 being saved by the system. The system then determines the angle of intersection 410 between the first and second rays. This angle of intersection does exceed the preset angle threshold 404 defined by a preset angle threshold value 403. The system then determines the position of the intersection 411 of the first ray 402 and the second ray 409 and hence determines the position of the new POI.

Figure 5:
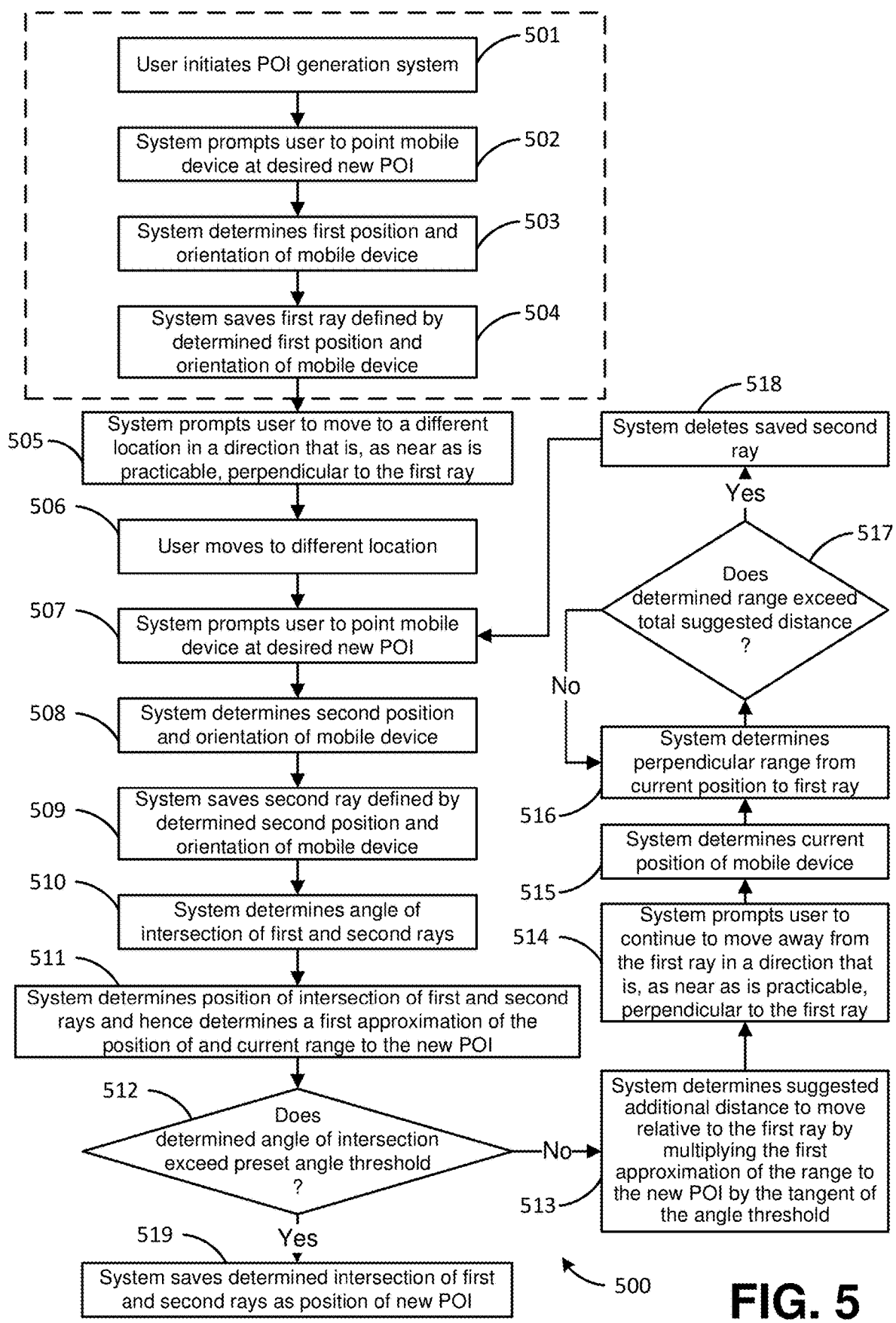
FIG. 5 is a flowchart illustrating a possible mode of operation of the system.

FIG. 5 is a flowchart 500 illustrating a possible more advanced mode of operation of the system. Given the inherent inaccuracies of both positioning systems such as GPS and heading sensors such as flux gate compasses this mode of operation of the system is intended to rapidly enable a user of the system to more efficiently determine the position of a new POI, especially if it is relatively distant and hence the angle of intersection of the first two rays is likely to be narrow initially. Using methods described below the user of the system would be prompted to move a suggested distance to a location that the system has determined may yield a more satisfactory result. In step 501, the user of the system initiates the POI generation system. The flowchart then branches to step 502. In step 502 the system prompts the user to point the mobile device that the system is running on at the location of the desired new POI. The flowchart then branches to step 503. In step 503 the system determines a first position and orientation of the mobile device. The flowchart then branches to step 504. In step 504 the system saves a first ray origin determined from the first position and orientation of the mobile device. The flowchart then branches to step 505. In step 505 the system prompts the user to move in a direction away from the first ray origin, such as in a direction as near as practicable to perpendicular to the first ray origin. The flowchart then branches to step 506. In step 506 the user moves to a different location. The flowchart then branches to step 507. In step 507 the system prompts the user to again point the mobile device at the desired new POI. The flowchart then branches to step 508. In step 508 the system determines the second position and orientation of the mobile device. The flowchart then branches to step 509 in which the system saves the second ray origin determined from the determined second position and orientation of the mobile device. The flowchart then branches to step 510. In step 510 the system determines the angle of intersection between the first and second rays. The flowchart then branches to step 511. In step 511 the system determines the position of the intersection of the first and second rays and hence determines a first approximation of the position of and the current range to the new POI. The flowchart then branches to step 512. In step 512 the system determines if the angle of intersection between the first and second rays exceeds a preset angle threshold. If the angle of intersection between the first and second rays does exceed a preset angle threshold then the flowchart branches to step 519 in which the system in which the system saves the determined location of the intersection of the first and second rays as the position of the new POI and prompts the user to add other information as desired relating to that new POI such as name, type, etc. If the angle of intersection between the first and second rays does not exceed a preset angle threshold then the flowchart branches to step 513. In step 513 the system determines a suggested total distance to move away from away from the first ray in order to refine the determined position of the new POI by multiplying the first estimation of the range to the new POI by the tangent of the angle threshold. For example, if the estimated range is 300 m and the angle threshold is 30° then the suggested total distance to move perpendicular to the first ray would be approximately 174 m (y=300*tan 30). The flowchart then branches to step 514. In step 514 the system prompts the user to continue to move away from the first ray. The flowchart then branches to step 515 in which the system determines the current position of the mobile device. The flowchart then branches to step 516 in which the system determines the current perpendicular range to the first ray. The flowchart then branches to step 517. In step 517 the system determines if the total current distance exceeds the suggested total distance to move away from the first ray. If the total current distance does not exceed the suggested total distance to move away from the first ray the flowchart branches back to step 516. If the total current distance does exceed the suggested total distance to move away from the first ray the flowchart branches back to step 518 in which the system deletes the saved second ray and then branches back to step 507. By in effect generating a temporary range threshold based upon the first approximation of the range to the position of the new POI methods such as those described enable the system to determine the position of the new POI more efficiently. While the position of most POIs should be determined by going through the method described one time very distant POIs may require additional iterations of the method. For example, a very distant POI may return a first approximation of the position of the POI much closer than it actually is because of the very narrow angle of intersection and inherent errors in the sensor systems. Hence even after moving the suggested distance from the first ray the angle of intersection may still be less than the angle threshold. In this case the system would again determine a suggested distance and once again prompt the user to move further away from the first ray.

Figure 6:
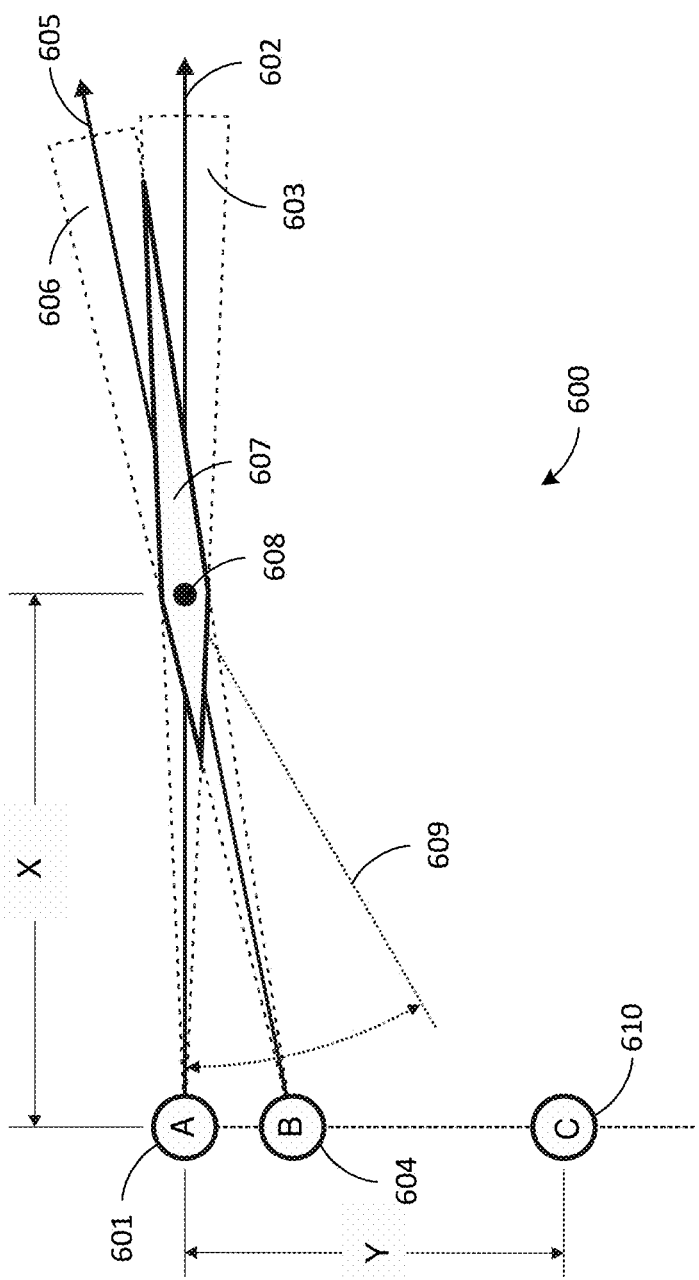
FIG. 6 is a drawing, in plan view, illustrating a mobile device generating a new POI using a mode of operation shown in FIG. 5.
Figure 7:
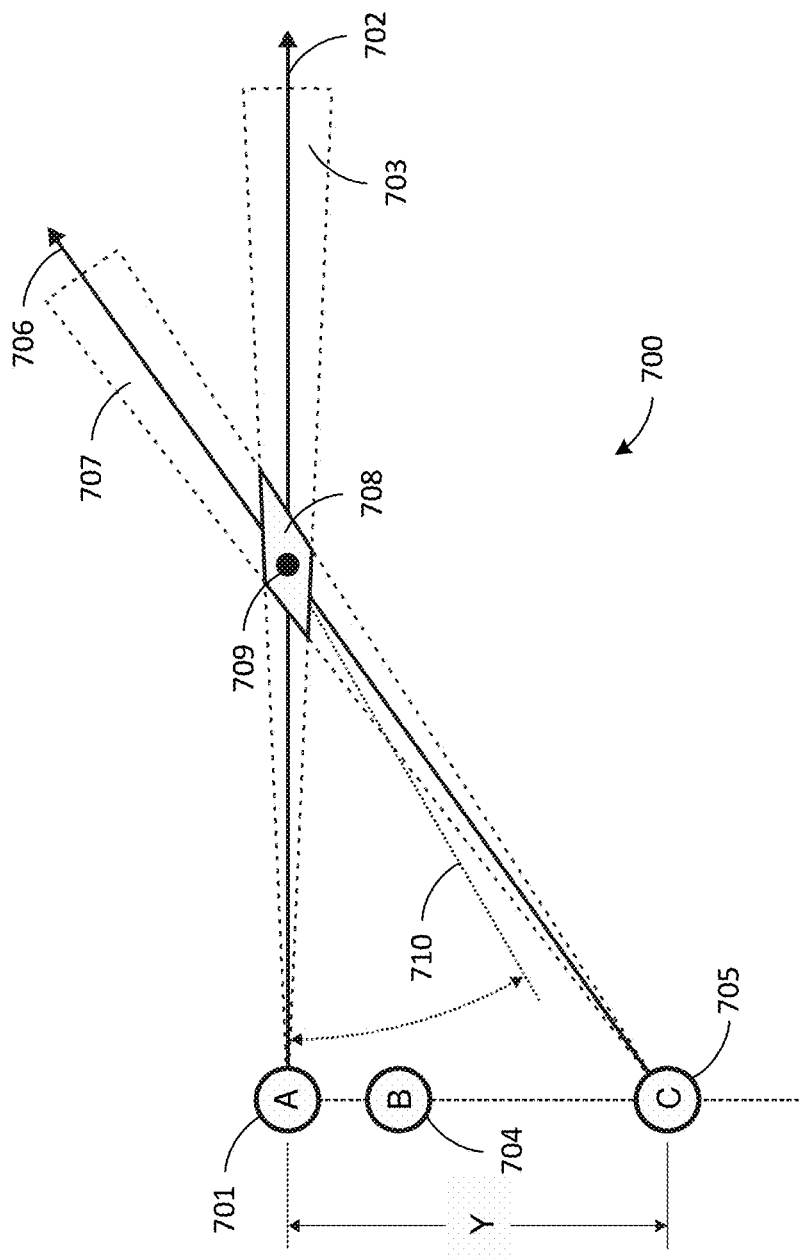
FIG. 7 is a drawing, in plan view, illustrating another example of a mobile device generating a new POI using a mode of operation shown in FIG. 5.

FIGS. 6 and 7 are line drawings 600 and 700 in plan view illustrating a mobile device generating a new POI using the mode of operation described in FIG. 5 and related text. While the accuracy of modern heading sensors such as flux gate compasses is relatively high, typically +/−1.5° or less, the inaccuracy illustrated in FIGS. 6 and 7 has been exaggerated to +/−5° for purposes of clarity. The potential for positional error in systems such as GPS should also be appreciated but have not been illustrated here.

In FIG. 6 a mobile device at position A 601 is pointed at the desired new POI and this results in a first ray 602 being saved. This ray has a potential for error of +/−5° and hence the position of the new POI may be within the first potential area of error 603 relative to position A 601. The mobile device position is then moved by the user of the system to position B 604. At position B 604 the user of the system again points the mobile device at the desired POI and this results in a second ray 605 being saved by the system. This ray also has a potential for error of +/−5° and hence the position of the new POI may be within the second potential area of error 606 relative to position B 604. The system then determines the angle of intersection between the first and second rays and the first approximation of the position of the intersection of the first and second rays and hence determines the first approximation of range X from position A to the first approximation of the position of the new POI 608. The angle of intersection of the first ray 602 and the second ray 605 is determined to be less that the angle threshold 609 and hence the system determines a suggested total distance Y to move away from the first ray 602 in order to further refine the position of the new POI by multiplying the approximate range X by the tangent of the angle threshold 609. The intersection 607 of the first potential area of error 603 and the second potential area of error 606 define the boundaries of the area that encompasses the possible location of the new POI. It should be appreciated that if the angle of intersection of the first and second rays is relatively narrow, as it is in this case, then the possible error in the determination of the true position of the new POI is very high especially in distance from the first position A. The system hence prompts the user to move to a new location C 610 a suggested distance Y away from the first ray to increase the angle of intersection and hence increase the accuracy of the determination of the position of the new POI.

In FIG. 7, the mobile device was at position A 701 and was pointed at the new POI resulting in a first ray 702 and a first potential area of error 703 in which the POI may be located. The system prompted the used to move from position B 704 a total suggested distance Y from the first ray 702 to position C 705. The system monitors the position of the mobile device and when the position of the mobile device matches, or is close enough to, position C 705 the system prompts the user to point the mobile device at the new POI. This defines a second ray 706 with a related second potential area of error 707 in which, again, the POI may be located. The determined angle of intersection of the first ray 702 and the second ray 706 is determine to be greater than the angle threshold 710 and therefore the determined position of the intersection of the first ray 702 and the second ray 706, while within an area of possible error 708 defined by the intersection of the first and second areas of potential error 703 & 707, is now considered to be of sufficient accuracy to be saved as the position of the new POI. The inherent error of the heading sensor has been exaggerated for the purposes of clarity and hence the area of possible error 708 appears to be relatively large while more typically, there would be a much lower possible error in heading sensing the actual area of possible error would be much smaller.

It should also be appreciated that while the methods illustrated in the figures are in plan view, i.e., two-dimensional as viewed from above, the methods described could also be applied in three dimensions with the rays defined by the pointing of the mobile device including a vertical angular component. This vertical angular component of pointing a mobile device may be sensed by various means including, but not limited to, accelerometers, inclinometers, etc. This would enable the creation of new POIs that were above or below the position of the mobile device, such as a specific floor of a building, when the rays were captured. The new POI may be defined by the intersection of the two rays themselves or may alternately be defined by the intersection of two conic shapes defining the potential area of error (defined above) associated with each ray. Determining the altitude of the new POI would be a matter of determining the elevation change, using trigonometry, from the known positions of the mobile device when the rays are captured.

For the first example of the system in use, suppose there is a person walking around in a city. They are using a search app that recalls POIs and displays them to the user by initiating pointing searches, much as described previously, by determining the position of the phone, or other mobile device, and its orientation. A polygon or search region in that direction is created and POIs that fall within this polygon are displayed to the user. They can point their device around and be shown what they are pointing at, discovering tourist POIs, restaurants and their menus, etc. as they move about town. They recently read about a new restaurant that opened and they see it across a busy four lane street. They would like to find out the restaurant's hours and see if they can make a reservation, so they point their mobile device in the direction of the restaurant and initiate a pointing search. The restaurant is not in the search results returned so it is not in the POI database. The user switches the app from search mode to "add POI" mode. They point in the direction of the restaurant from their current location, creating "vector A" that intersects with the restaurant. They then move 20 or 30 yards down the sidewalk and again point at the restaurant creating "vector B" that also intersects with the restaurant. The intersection of the two vectors is the geographic point where the restaurant POI is located. They then submit the new POI for inclusion in the master database. They may of course also add information relating to the POI, name, hours, cuisine type etc., when they make the submission.

For the next example of the system in use, suppose there is a similar situation to the previous example wherein a user would like to create a new POI but this time the POI is a polygon. The polygon represents the actual geographic shape of the building. The building is a rectangle so the user making four points defines the polygon. From their first position, they might point at the four corners of the building creating vectors 1A, 2A, 3A, and 4A. They then move to a second position and again point at the four corners of the building in the same order as from their first position creating vectors 1B, 2B, 3B, and 4B. The intersections of vectors 1A and 1B create the point 1. The intersections of vectors 2A and 2B create the point 2. The intersections of vectors 3A and 3B create the point 3. And the intersections of vectors 4A and 4B create the point 4. The four points define the polygon and it is added to the database as described in the previous example.

There is also a method that would allow a user to create multiple POIs that stemmed from the creation of a single POI. For example, a user may create a single point POI and wish to create several POIs in relation to the point POI. While creating the point POI they instruct the system to also create single point POIs for a distance of 200 meters at 20-meter increments in the direction of creation vector A. They may also instruct the system to create POIs in a similar manner but to the north of the point POI. They may also instruct the system to create a grid of POIs in relation to the point POI that either corresponds to one the vectors used to create the POI or on a compass bearing relative to the POI. If they are creating multiple POIs relative to a polygon POI they may instruct the system to perform a similar function and create like polygons at a specified distance and range from the original POI in a specified direction from the POI.

For example, if the user has to add several new utility poles to a POI database, they could follow this method. They create a POI for the first utility pole by pointing at it from two separate locations, creating the two vectors, A and B, whose intersection defines the geographic location of the utility pole. They know that the utility poles were installed at intervals of 25 yards for two miles in the direction of the first creation vector, A. They therefore instruct the system to create POIs in that direction, at that interval for that distance. The POIs would be numbered in their order away from the first POI.

There may be times one a user does not want to create a POI but modify it in some way. One way might be to add information to the POI. The user might be a house painter and while he is driving to a job he notices a house the he had recently painted. He points his mobile phone at the home initiating a geospatial pointing search and the MLS listing for the house comes up. He adds the information (this would probably need to be authorized by the homeowner) that his company had painted the home, with his contact information, etc. Now when other users point at the home (or find it in a variety of other manners, such as a 360 geographic search, selecting it from a map or a list), perhaps in admiration of the paint job, they can find out who painted the home and how to reach them. Gardeners, landscapers and other home service providers could also benefit from this method of altering POIs. Other alteration to a POI that could be initiated by pointing at a POI could be to add other content such as a review or photos relevant to the POI.

Another example of a modification to an existing POI may be to suggest a more accurate geolocation for the POI in the POI database. These databases sometime have objects represented in the database at a point that does not accurately match the POIs real-world location. For this example, we have a user who is in San Francisco's Washington Square Park in the North Beach neighborhood. The park boasts a beautiful statue of founding father Benjamin Franklin. The park's field is being reseeded so there is no way for the user to walk up to the statue and read the plaque that adorns it. The user would still like to read what is on the plaque, so they point their mobile device at the statue and perform a pointing search. The statue does not appear in the results. Wondering why this is, the user switches to a map view of the local POIs and sees that the geolocation of the statue is incorrect; it had been placed on the path surrounding the field to the north. To correct this the user goes back to pointing mode and points at the statue from their current position creating vector A. They then walk around the path to a spot some distance away and again point at the statue creating vector B. The geographic intersection of these two vectors is the correct location of the statue and the user submits it to the POI database so it can be updated. It should be noted that the user may wish to store the new POI location for their own use until the master POI database is updated. A personal POI. These personal POIs may be stored locally on a mobile device on online for access via wireless data connection.

Another use of personal POIs that are created by the system using the methods previously described may be for safety or for geolocated gaming. For example, we have a school group going to a park for a scavenger hunt in a park. The items are hidden through the main center area of the park. The students are wearing devices that inform the chaperones of their location. These items could be a mobile device with positioning means, or a smart watch also with positioning means, or a number of other devices. One of the counselors can easily create a polygon shape that encompasses the scavenger hunt area with four or more nodes using the method described previously. This polygon can serve as a walled garden for the event. Once created if a student ventures out of the polygon, out of the walled garden, their positioning device can alert them of this transgression and alert the chaperones, therefore keeping the students safe. The walled garden polygon may be saved for later user or even made available to others who wish to have similar activities in the park. For another example, in this case one that uses geolocate gaming, we have users that wish to play a game of virtual disc golf and they need to create the holes, 1-18, as geolocated POIs. Using their mobile devices and using the methods described above they create their virtual golf course, including a master polygon POI that represents the boundary of their virtual disc golf course for out of bounds rules. They then play their game, throwing their virtual discs to the virtual holes with their mobile devices. Again, the POIs, the course, could be saved for later use or made public for others to use. Other examples of personally created POIs that may be made available to the public are pub crawls, favorite restaurants, or pieces of public art.

It may be the case that some POIs that are created with these methods have a time sensitive lifespan, that they are erased from the POI database after a certain time or date after they have been created. For example, a user might want to make POIs that represent all of the music stages and other services such as food and restrooms in festival venue and make them available to people who are attending a music festival. The festival runs from Friday through Sunday evening. Friday through Sunday the POIs are available for people to use to navigate their way around the festival and find out all of the goings on. Once Sunday is over, the stroke of midnight perhaps, the POIs would be erased from the database.

There may be instances where a user's physical relationship or distance from a POI they have created may cause that POI to be erased either from a POI database stored locally on their device or from a POI database stored online. For example, we have a user who created a set of POIs using the previously described methods for an interactive game of a virtual treasure hunt while they were on a vacation in Paris. They had no need for the POIs once they left Paris so they set a distance threshold for the set of POIs they created for the game. Once their mobile device senses that they are at a distance over 50 miles from Paris the treasure hunt POIs they created while in Paris are erased.

Another use for POIs a user has created with the methods previously described would be to have their POIs stored online, such as in the cloud) and then have entire sets of POIs downloaded and cached on their mobile device while they are in close proximity to the real-world geolocation of the POIs in the set. For example, we have a user who went on a vacation to Edinburgh, Scotland. While on vacation they created a personal set of POIs using the methods previously described to make a POI database of their favorite flower beds in the city parks and on private grounds. Once they left Edinburgh they stored the database online. While at home in San Jose, Calif. they have no need for this set of POIs, so it remains online and not on the user's device. A few years later they find themselves in Edinburgh again. Having sensed the user's location, and therefore their proximity to the real-world location of their floral POI set, the system downloads the POI set to the user's mobile device. Perhaps this is done while on a WiFi network, and this way the user can access their personal POI database as they travel around the city without incurring data fees when they access the POIs. Again, they may choose to make this POI database publicly available and others wishing to use the database can choose to have it download upon their arrival in Edinburgh.

As mentioned previously, once a POI has been created it can be beneficial to append information to the POI including but not limited to the address, phone number and the name of the POI. It is possible to automate the appending of some of this information, particularly the address, and in some cases the name, by searching for a similar latitude and longitude to that of a newly created point POI and determining if that coordinate is encompassed by a geographical area of know attributes. Additionally, the boundaries of the geographical area itself may be added to the POI to create a new POI with the boundaries of that geographical area. In the first example we have a user who creates a POI for a restaurant that was not in the POI database. It is very likely that while the restaurant itself is new it is within into an existing building. The previous business was most likely in a POI database and it would therefore have an almost matching latitude and longitude. Once the matching latitude and longitude are confirmed the address of the new restaurant can be added to the new POI, since it is the same as that of the previous business, along with the boundaries of the building itself. For example, the POI could become a polygonal POI rather than a point POI.

Another method to append information to newly created POIs would be to check and see if the new POIs that were being created, point or polygon POIs, were being created within the geographic area of an existing polygon POI. For example, we have a user who is creating point POIs within the boundary of an existing polygon POI, a grocery store. The name of the grocery store is known, Gil's Grocery for example, so each newly created POI would be appended with the name of the grocery store; "Gil's Grocery" to preface the user added name of the created POIs. Gil's Grocery Bakery Department, Gil's Grocery Butcher Counter and so on. Additionally, the building could be highlighted on a map for confirmation. The user could then confirm and, if so desired, add photos, description, reviews etc.

Figure 8:
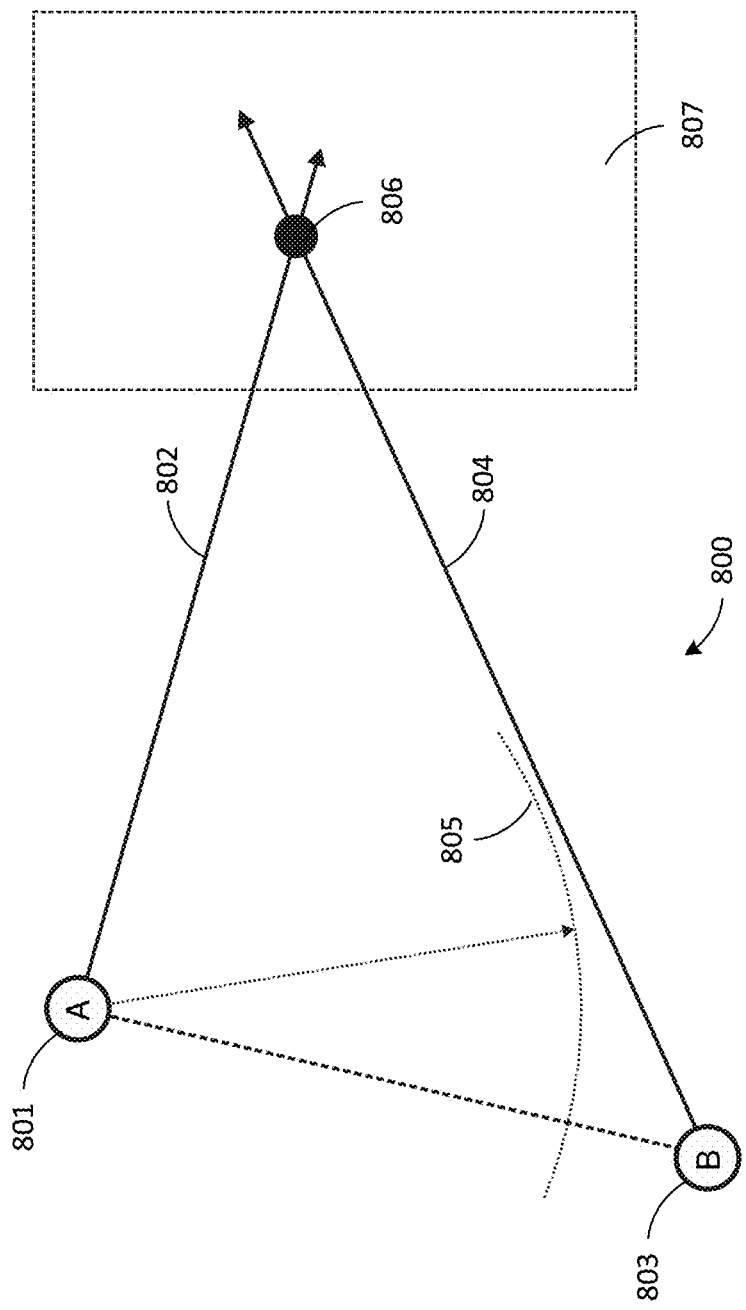
FIG. 8 is a drawing, in plan view, illustrating a mobile device generating a new POI using methods described in FIG. 1 and automatically appending information to that new POI.

FIG. 8 is a line drawing 800 in plan view illustrating a mobile device generating a new POI using methods described in FIG. 1 and related text and automatically appending information to that new POI. A mobile device at position A 801 is pointed at the desired new POI and this results in a first ray 802 being saved. The mobile device position is then moved by the user of the system to position B 803. At position B 803 the user of the system points the mobile device at the desired POI and this results in a second ray 804 being saved by the system. The system then determines that the range from position A 801 to position B 803 exceeds the preset range threshold 805 and hence system saves determines the determined position of the intersection 806 of the first ray 802 and the second ray 804 as the position of the new POI. The system then determines that the position of the new POI at intersection 806 is encompassed by a known geolocated area 807 with existing attributes. The system automatically adds those attributes (address, geolocated area, name, boundaries of geolocated area, etc.) to the new POI or alternatively queries the user of the system if they would like to add some or all of these attributes to the new POI.

Alternatively, a point POI may be generated by determining the position of the mobile device, such as with GPS, and if that POI is determined to be within the boundaries of a geolocated area or polygon, such as the known footprint of a building, then the system may automatically add those attributes (address, geolocated area, name, boundaries of building, etc.) to the new POI or alternatively query the user of the system if they would like to add some or all of these attributes to the new POI. The information regarding the geolocated area and its related attributes may be available from multiple sources.

Figure 9:
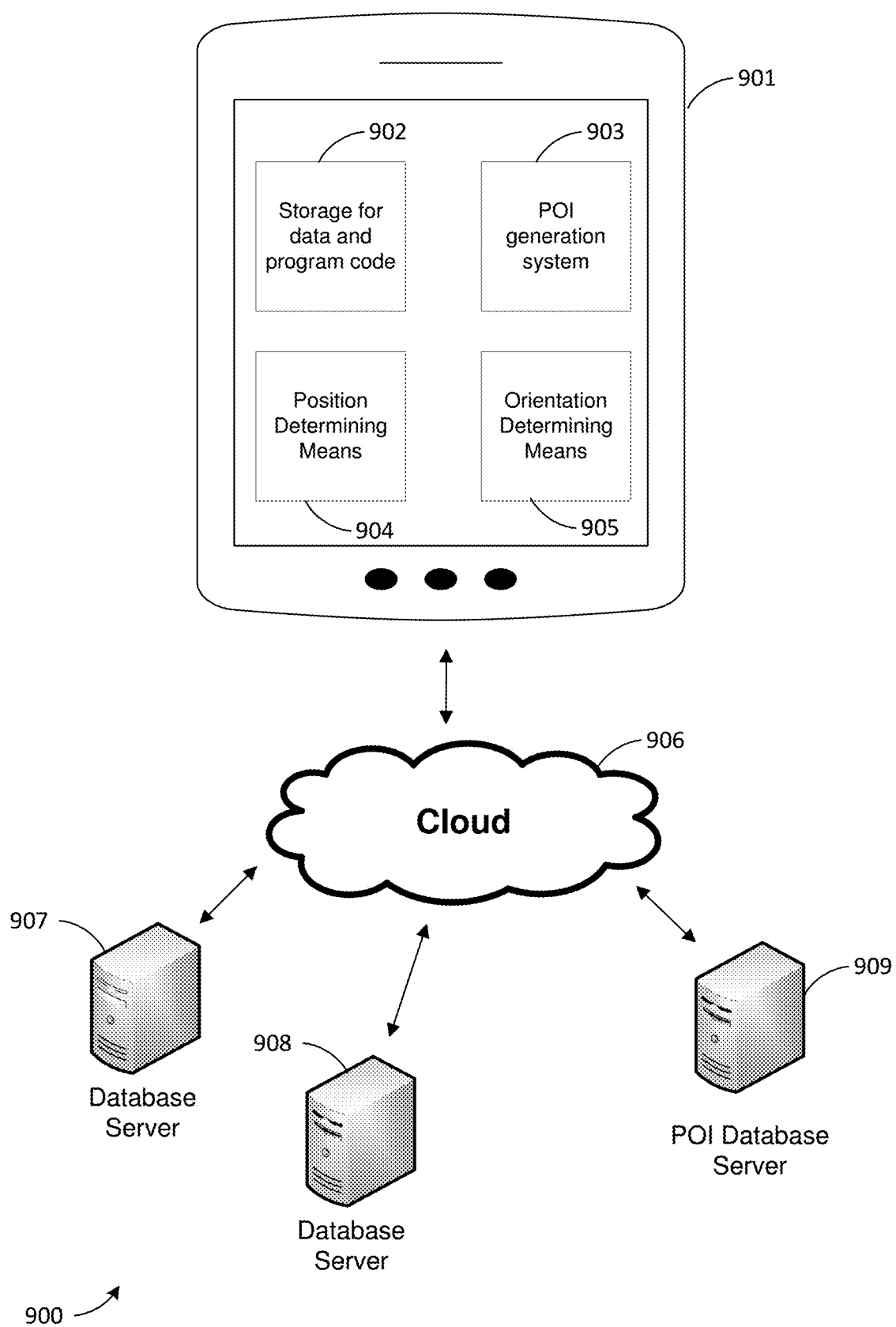
FIG. 9 is a simplified functional block diagram of an embodiment of a networked smart phone operable for generating new POIs using the system.

FIG. 9 is a simplified functional block diagram 900 of an embodiment of a networked smart phone operable for generating POIs. A Smart Phone 901 comprises, among other components, storage for data and program code 902, a POI generation subsystem, a position determining means 904 and an orientation determining means 905. Data from the position determining means 904 and orientation determining means 905 is utilized by the POI generation subsystem to generate a POI using various methods as described above. The smart phone is in communication via the cloud 906 with various database servers 907 and 908 that may contain additional information relating to the new POI. This additional information may be accessed by the POI generation subsystem 903 and appended to the information defining the new POI. The information defining the new POI is then transmitted via the cloud 906 to a POI database server 909 in which the information defining the new POI is stored and made available to various applications.

Moving POIs may only update their geo location if their position changed beyond a set threshold of distance and the velocity as determined by the GPS device is less than a set threshold. This thereby eliminates the continuous updating of geolocation that can cause server overload and bandwidth at scale.

According to one embodiment, the techniques described herein are implemented by one or more generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques.

Figure 10:
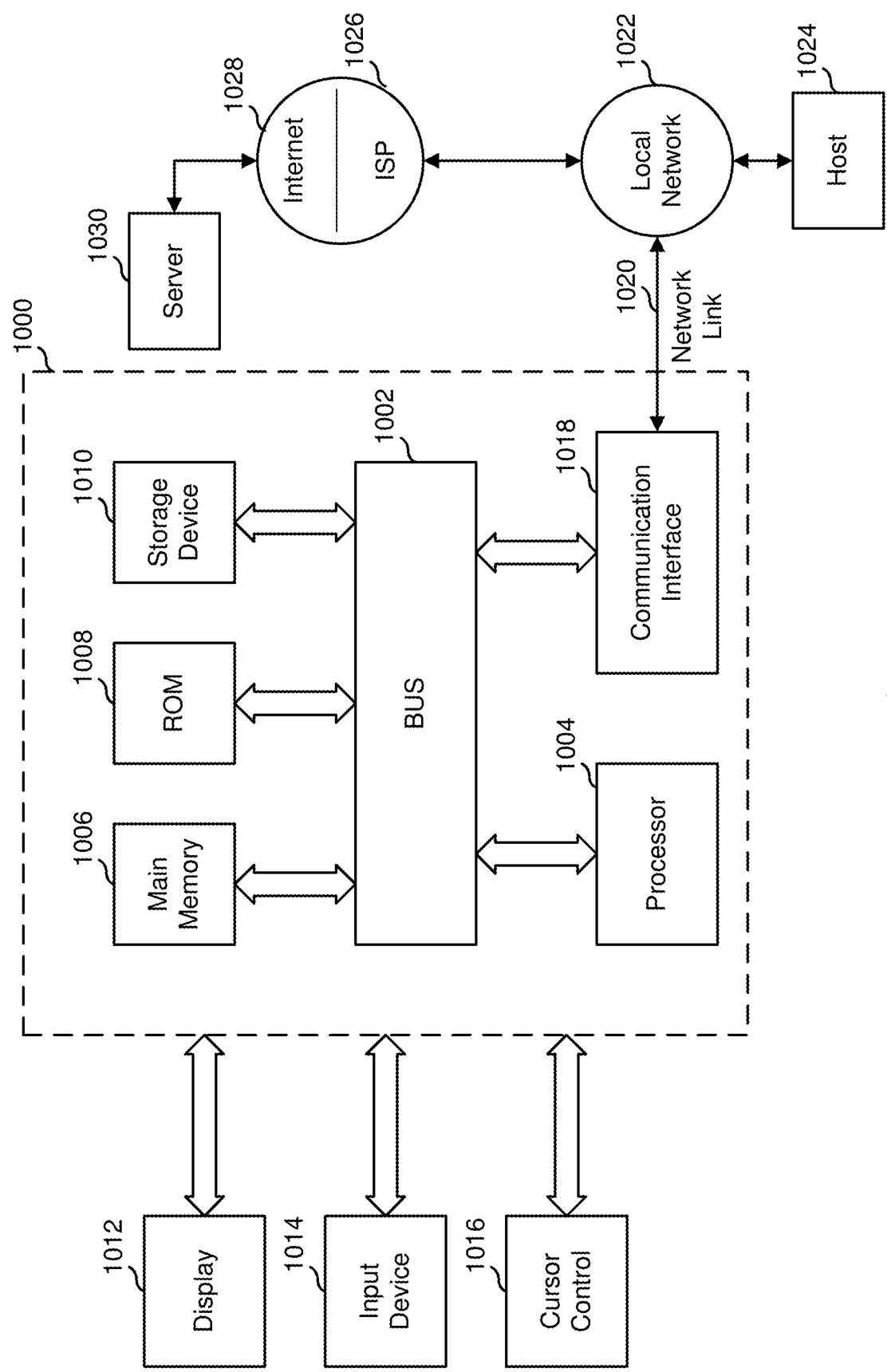
FIG. 10 is a block diagram that illustrates a computer system upon which the computer systems of the systems described herein may be implemented.

For example, FIG. 10 is a block diagram that illustrates a computer system 1000 upon which the computer systems of the systems described herein may be implemented. Computer system 1000 includes a bus 1002 or other communication mechanism for communicating information, and a processor 1004 coupled with bus 1002 for processing information. Processor 1004 may be, for example, a general-purpose microprocessor.

Computer system 1000 also includes a main memory 1006, such as a random-access memory (RAM) or other dynamic storage device, coupled to bus 1002 for storing information and instructions to be executed by processor 1004. Main memory 1006 may also be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a computer monitor, for displaying information to a computer user. An input device 1014, including alphanumeric and other keys, is coupled to bus 1002 for communicating information and command selections to processor 1004. Another type of user input device is a cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may include non-volatile media and/or volatile media. Non-volatile media includes, for example, optical or magnetic disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that include bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid-state drive of a remote computer. The remote computer can load the instructions into its dynamic memory and send the instructions over a network connection. A modem or network interface local to computer system 1000 can receive the data. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be a network card, a modem, a cable modem, or a satellite modem to provide a data communication connection to a corresponding type of telephone line or communications line. Wireless links may also be implemented. In any such implementation, communication interface 1018 sends and receives electrical, electromagnetic, or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world-wide packet data communication network now commonly referred to as the "Internet" 1028. Local network 1022 and Internet 1028 both use electrical, electromagnetic, or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020, and communication interface 1018. In the Internet example, a server 1030 might transmit a requested code for an application program through the Internet 1028, ISP 1026, local network 1022, and communication interface 1018. The received code may be executed by processor 1004 as it is received, and/or stored in storage device 1010, or other non-volatile storage for later execution.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The code may also be provided carried by a transitory computer readable medium e.g., a transmission medium such as in the form of a signal transmitted over a network.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

The use of examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

What is claimed is:

1. A method of generating data for a point of interest database accessible over a network by location-ware devices, the method comprising:

obtaining a first position value based on a first position of a first mobile device at a first interaction time;
obtaining a first orientation value based on a first orientation of the first mobile device at the first interaction time, whereby the first position value and the first orientation value define a first ray extending from the first position in a first direction defined by the first orientation value;
obtaining an intermediate position value and an intermediate orientation value of the first mobile device based on an intermediate position of the first mobile device at an intermediate interaction time;
computing an intermediate intersection point, located in a geographic space, based on the first position value, the first orientation value, the intermediate position value and the intermediate orientation value;
detecting an insufficient resolution at the intermediate intersection point;
prompting a user of the first mobile device to move towards a second position that is different than the first position by a distance difference based on the insufficient resolution as to the intermediate intersection point;
obtaining a second position value based on the second position of the first mobile device at a second interaction time;
obtaining a second orientation value based on a second orientation of the first mobile device at the second interaction time, whereby the second position value and the second orientation value define a second ray extending from the second position in a second direction defined by the second orientation value;
computing an intersection point, located in the geographic space, at an intersection of the first ray and the second ray, where there is an intersection; and
storing the intersection point as a location for a point of interest (POI) in the point of interest database.

2. A system, comprising at least one computing device configured to implement one or more services, wherein the one or more services are configured to:

obtain a first position value based on a first position of a first mobile device at a first interaction time;
obtain a first orientation value based on a first orientation of the first mobile device at the first interaction time, whereby the first position value and the first orientation value define a first ray extending from the first position in a first direction defined by the first orientation value;
obtain an intermediate position value and an intermediate orientation value of the first mobile device based on an intermediate position of the first mobile device at an intermediate interaction time;
computing an intermediate intersection point, located in a geographic space, based on the first position value, the first orientation value, the intermediate position value and the intermediate orientation value;
detecting an insufficient resolution at the intermediate intersection point;
prompting a user of the first mobile device to move towards a second position that is different than the first position by a distance difference based on the insufficient resolution as to the intermediate intersection point;
obtain a second position value based on the second position of the first mobile device at a second interaction time;
obtain a second orientation value based on a second orientation of the first mobile device at the second interaction time, whereby the second position value and the second orientation value define a second ray extending from the second position in a second direction defined by the second orientation value;

compute an intersection point, located in the geographic space, at an intersection of the first ray and the second ray, where there is an intersection; and store the intersection point as a location for a point of interest (POI) in a point of interest database.

3. A non-transitory computer-readable storage medium having stored thereon executable instructions that, when executed by one or more processors of a computer system, cause the computer system to at least:

obtain a first position value based on a first position of a first mobile device at a first interaction time;

obtain a first orientation value based on a first orientation of the first mobile device at the first interaction time, whereby the first position value and the first orientation value define a first ray extending from the first position in a first direction defined by the first orientation value;

obtain an intermediate position value and an intermediate orientation value of the first mobile device based on an intermediate position of the first mobile device at an intermediate interaction time;

compute an intermediate intersection point, located in a geographic space, based on the first position value, the first orientation value, the intermediate position value and the intermediate orientation value;

detect an insufficient resolution at the intermediate intersection point;

prompt a user of the first mobile device to move towards a second position that is different than the first position by a distance difference based on the insufficient resolution as to the intermediate intersection point;

obtain a second position value based on the second position of the second first mobile device at a second interaction time;

obtain a second orientation value based on a second orientation of the first mobile device at the second interaction time, whereby the second position value and the second orientation value define a second ray extending from the second position in a second direction defined by the second orientation value;

compute an intersection point, located in the geographic space, at an intersection of the first ray and the second ray, where there is an intersection; and store the intersection point as a location for a point of interest (POI) in a point of interest database.

* * * * *